(12) United States Patent
Sun et al.

(10) Patent No.: US 9,160,454 B2
(45) Date of Patent: Oct. 13, 2015

(54) HAMMING CODED MODULATION

(71) Applicant: Infinera Corporation, Sunnyvale, CA (US)

(72) Inventors: Han H. Sun, Ottawa (CA); Kuang-Tsan Wu, Ottawa (CA)

(73) Assignee: Infinera Corporation, Sunnyvale, CA (US)

( * ) Notice: Subject to any disclaimer, the term of this patent is extended or adjusted under 35 U.S.C. 154(b) by 81 days.

(21) Appl. No.: 14/042,401

(22) Filed: Sep. 30, 2013

(65) Prior Publication Data

US 2015/0030333 A1    Jan. 29, 2015

Related U.S. Application Data

(60) Provisional application No. 61/858,047, filed on Jul. 24, 2013.

(51) Int. Cl.
| | |
|---|---|
| *H04B 10/50* | (2013.01) |
| *H04B 10/556* | (2013.01) |
| *H04L 1/00* | (2006.01) |
| *H04J 14/02* | (2006.01) |
| *H04B 10/61* | (2013.01) |

(52) U.S. Cl.
CPC .......... *H04B 10/5561* (2013.01); *H04B 10/505* (2013.01); *H04B 10/612* (2013.01); *H04B 10/613* (2013.01); *H04J 14/02* (2013.01); *H04L 1/0052* (2013.01)

(58) Field of Classification Search
CPC ............. H04B 10/505; H04B 10/5055; H04B 10/556; H04B 10/5561; H04B 10/612; H04B 10/613; H04B 10/616; H04L 1/0052; H04J 14/02

See application file for complete search history.

(56) References Cited

U.S. PATENT DOCUMENTS

| | | | | |
|---|---|---|---|---|
| 5,781,569 A | * | 7/1998 | Fossorier et al. | 714/795 |
| 7,046,694 B2 | * | 5/2006 | Kumar | 370/487 |

OTHER PUBLICATIONS

Agrell et al., "Power-Efficient Modulation Formats in Coherent Transmission Systems", Journal of Lightwave Technology, Apr. 24, 2009, 12 pages.

(Continued)

*Primary Examiner* — Leslie Pascal
(74) *Attorney, Agent, or Firm* — Harrity & Harrity LLP; David L. Soltz

(57) ABSTRACT

An optical system may include a digital signal processor (DSP) to receive first samples of a digital signal. The first samples may be Hamming encoded. The DSP may correlate the first samples to multiple groups of second samples to determine multiple correlation values. Each of the multiple groups of second samples may correspond to respective code words. Each of the multiple correlation values may correspond to a correlation measurement between the first samples and each of the multiple groups of second samples. The DSP may determine a particular code word, of the multiple code words, corresponding to one of the correlation values of the multiple correlation values; determine output bits based on bits of the particular code word and the one of the correlation values; and provide the output bits. The output bits may include data associated with the digital signal.

24 Claims, 11 Drawing Sheets

(56) References Cited

OTHER PUBLICATIONS

Millar et al., "A 24-Dimensional Modulation Format Achieving 6 dB Asymptotic Power Efficiency", Optical Society of America, Novel Modulation and Coding (SPM3D), Jul. 14-17, 2013, 3 pages.

Coelho et al., "Global Optimization of Fiber-Optic Communication Systems using Four-Dimensional Modulation Formats", ECOC Technical Digest, 2011, 3 pages.

Karlsson et al., "Which is the most power-efficient modulation format in optical links?", vol. 17, No. 13, Optics Express 10814, Jun. 22, 2009, 6 pages.

* cited by examiner

HAMMING CODED MODULATION

RELATED APPLICATION

This application claims priority to U.S. Provisional Patent Application No. 61/858,047, filed Jul. 24, 2013, the disclosure of which is incorporated by reference herein in its entirety.

BACKGROUND

Wavelength division multiplexed (WDM) optical communication systems (referred to as "WDM systems") are systems in which multiple optical signals, each having a different wavelength, are combined onto a single optical fiber using an optical multiplexer circuit (referred to as a "multiplexer"). Such systems may include a transmitter circuit, such as a transmitter (Tx) photonic integrate circuit (PIC) having a transmitter component that includes a laser associated with each wavelength, a modulator configured to modulate the output of the laser, and a multiplexer to combine each of the modulated outputs (e.g., to form a combined output or WDM signal). Dual-polarization (DP) (also known as polarization multiplex (PM)) is sometimes used in coherent optical modems. A Tx PIC may include a polarization beam combiner (PBC) to combine two optical signals into a composite DP signal.

A WDM system may also include a receiver circuit having a receiver (Rx) PIC. The Rx PIC may include a polarization beam splitter (PBS) to receive an optical signal (e.g., a WDM signal), split the received optical signal, and provide two optical signals (e.g., associated with orthogonal polarizations) associated with the received optical signal. The Rx PIC may also include an optical demultiplexer circuit (referred to as a "demultiplexer") configured to receive the optical signals provided by the PBS and demultiplex each one of the optical signals into individual optical signals. Additionally, the receiver circuit may include receiver components to convert the individual optical signals into electrical signals, and output the data carried by those electrical signals.

The transmitter (Tx) and receiver (Rx) PICs, in an optical communication system, may support communications over a number of wavelength channels. For example, a pair of Tx/Rx PICs may support ten channels, each spaced by, for example, 200 GHz. The set of channels supported by the Tx and Rx PICs can be referred to as the channel grid for the PICs. Channel grids for Tx/Rx PICs may be aligned to standardized frequencies, such as those published by the Telecommunication Standardization Sector (ITU-T). The set of channels supported by the Tx and Rx PICs may be referred to as the ITU frequency grid for the Tx/Rx PICs.

In a WDM system, the transmitter circuit may modulate a phase of a signal in order to convey data (via the signal) to the receiver circuit where the signal may be demodulated such that data, included in the signal, may be recovered. A particular modulation format (e.g., phase-shift keying (PSK), quadrature amplitude modulation (QAM) or the like) may be used to modulate the signal. The signal may be subject to phase noise during transmission. To accommodate for the phase noise and to increase signal transmission performance, a ½ rate code, such as a Golay code, can be used to achieve lower bit error rates (BERs) for a given signal-to-noise ratio (SNR). However, in order to realize the reported performance benefit, maximum-likelihood decoding of Golay code or an approximate maximum-likelihood decoding method is required. Such maximum-likelihood decoding methods (e.g., in the case of Golay-coded systems) can be complex to implement, and simplified decoding methods can degrade signal transmission performance.

SUMMARY

According to some possible implementations, an optical system may include a digital signal processor (DSP) to receive first samples of a digital signal. The first samples of the digital signal may be Hamming encoded. The DSP may correlate the first samples to multiple groups of second samples to determine multiple correlation values. Each of the multiple groups of second samples corresponding to a respective multiple code words. Each of the multiple correlation values corresponding to a correlation measurement between the first samples and each of the multiple groups of second samples. The DSP may determine a particular code word, of the multiple code words, corresponding to one of the correlation values of the multiple correlation values, determine output bits based on bits of the particular code word and the one of the correlation values, and provide the output bits. The output bits may include data associated with the digital signal.

According to some possible implementations, an optical system may include a first DSP to receive a group of input bits, encode the group of input bits using an (8,4) Hamming encoder, and provide symbols, associated with the group of input bits, based on encoding the group of input bits. The optical system may include a digital-to-converter (DAC) to receive the symbols, and provide a voltage corresponding to the symbols; a laser to provide an input optical signal; and a modulator to receive the voltage and the input optical signal, modulate the input optical signal based on the voltage to form an output signal, and provide the output signal. The optical system may include a second DSP to receive first samples of a digital signal corresponding to the output signal and correlate the first samples to multiple groups of second samples to determine multiple correlation values. Each of the multiple groups of second samples may correspond to a respective multiple code words. Each of the multiple correlation values may correspond to a correlation measurement between the first samples and each of the multiple groups of second samples. The second DSP may determine a particular code word, of the multiple code words, corresponding to one of the correlation values of the multiple correlation values, determine output bits based on bits of the particular code word and the one of the correlation values, and provide the output bits. The output bits may include data associated with the output signal.

According to some possible implementations, an optical system may include a local oscillator to provide a reference optical signal; a hybrid mixer to receive an input signal, receive the reference signal, and provide an optical signal corresponding to the input signal and the reference signal; a photodetector to receive the optical signal, and provide a voltage signal corresponding to the optical signal; and an analog-to-digital converter (ADC) to receive the voltage signal, and provide the digital signal based on receiving the voltage signal. The optical system may include a DSP to receive first samples of the digital signal. The first samples of the digital signal may be Hamming encoded. The DSP may correlate the first samples to multiple groups of second samples to determine multiple correlation values. Each of the multiple groups of second samples may correspond to a respective multiple code words. Each of the multiple correlation values may correspond to a correlation measurement between the first samples and each of the multiple groups of second samples. The DSP may determine a particular code word, of the multiple code words, corresponding to one of the correlation values of the multiple correlation values, determine output bits based on bits of the particular code word and the one of the correlation values, and provide the output bits. The output bits may include data associated with the digital signal.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements. Also, the following detailed description does not limit the disclosure.

Systems and/or methods, as described herein, may modulate an optical signal using a ½ code rate extended Hamming code (e.g., an (8,4) Hamming code) to increase transmission performance of the signal (e.g., reduce bit error rates (BERs) for a given signal-to-noise ratio (SNR).

Figure 1:
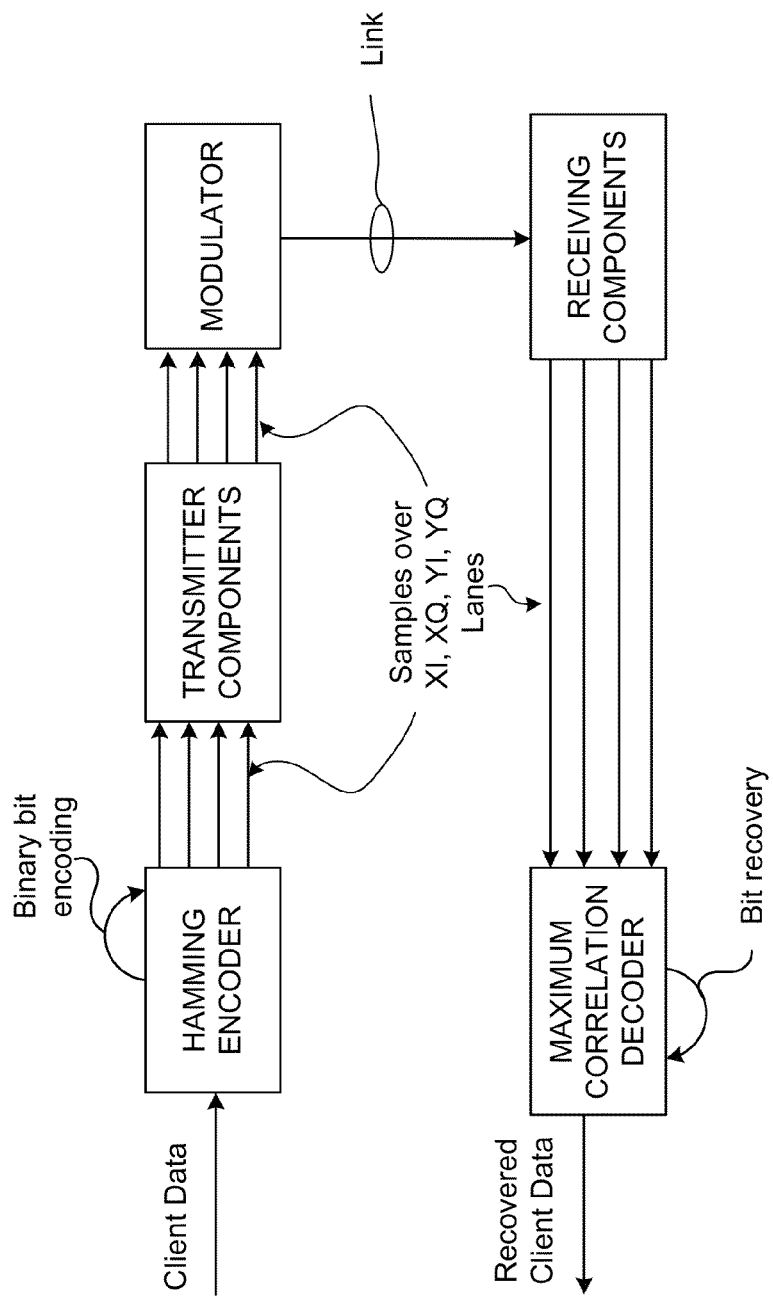
FIG. 1 illustrates an overview of an example implementation described herein.

FIG. 1 illustrates an overview of an example implementation as described herein. As shown in FIG. 1, a Hamming encoder may receive client data (e.g., in groups of 4 bits) and encode the bits using an (8,4) Hamming code to convert a group of 4 bits into 2 symbols on a Dual-Polarization Quadrature Phase-Shift Keying (DP-QPSK) constellation (also referred to as Polarization-Multiplex (PM) QPSK). In some implementations, each symbol may include an in-phase X-polarized (XI) sample, a quadrature X-polarized (XQ) sample, an in-phase Y-polarized (YI) sample, and a quadrature Y-polarized (YQ) sample. In some implementations, the Hamming encoder may provide the samples of the symbols to transmitter components over lanes associated with the samples. For example, the Hamming encoder may provide XI samples over an XI lane, XQ samples over an XQ lane, YI samples over a YI lane, and YQ samples over a YQ lane.

In some implementations, the transmitter components may process the samples (e.g., filter the samples, shape a spectrum, associated with the samples, etc.), and convert the samples to analog signals. A modulator may receive the analog signals, modulate an input optical signal based on the analog signals corresponding to the samples, and provide a modulated signal over an optical link to receiving components. In some implementations, the receiving components may process the received signal, correct for chromatic dispersion and/or timing skews of the received signal, and provide samples of the received signal (e.g., received samples) to a maximum correlation decoder.

In some implementations, the received samples may correspond to transmitted samples provided by the Hamming encoder, with phase noise introduced by the optical link. In some implementations, the maximum correlation decoder may correlate the received samples with samples associated with multiple known codes to determine a particular code word that most likely correlates with the received samples. For example, the maximum correlation decoder may determine a maximum correlation between the received samples and the known code word samples to determine the code word that most likely correlates with the received samples. That is, the maximum correlation corresponds to the minimum Euclidean distance.

Based on determining the code word, the maximum correlation decoder may provide bits, corresponding to the code word, as recovered client data. As a result, a ½ code rate (e.g., an (8,4) Hamming code) can be used to reduce bit error rates (BERs) for a given signal to noise ratio (SNR) value and to determine the bits that correspond to the recovered client data.

Figure 2:
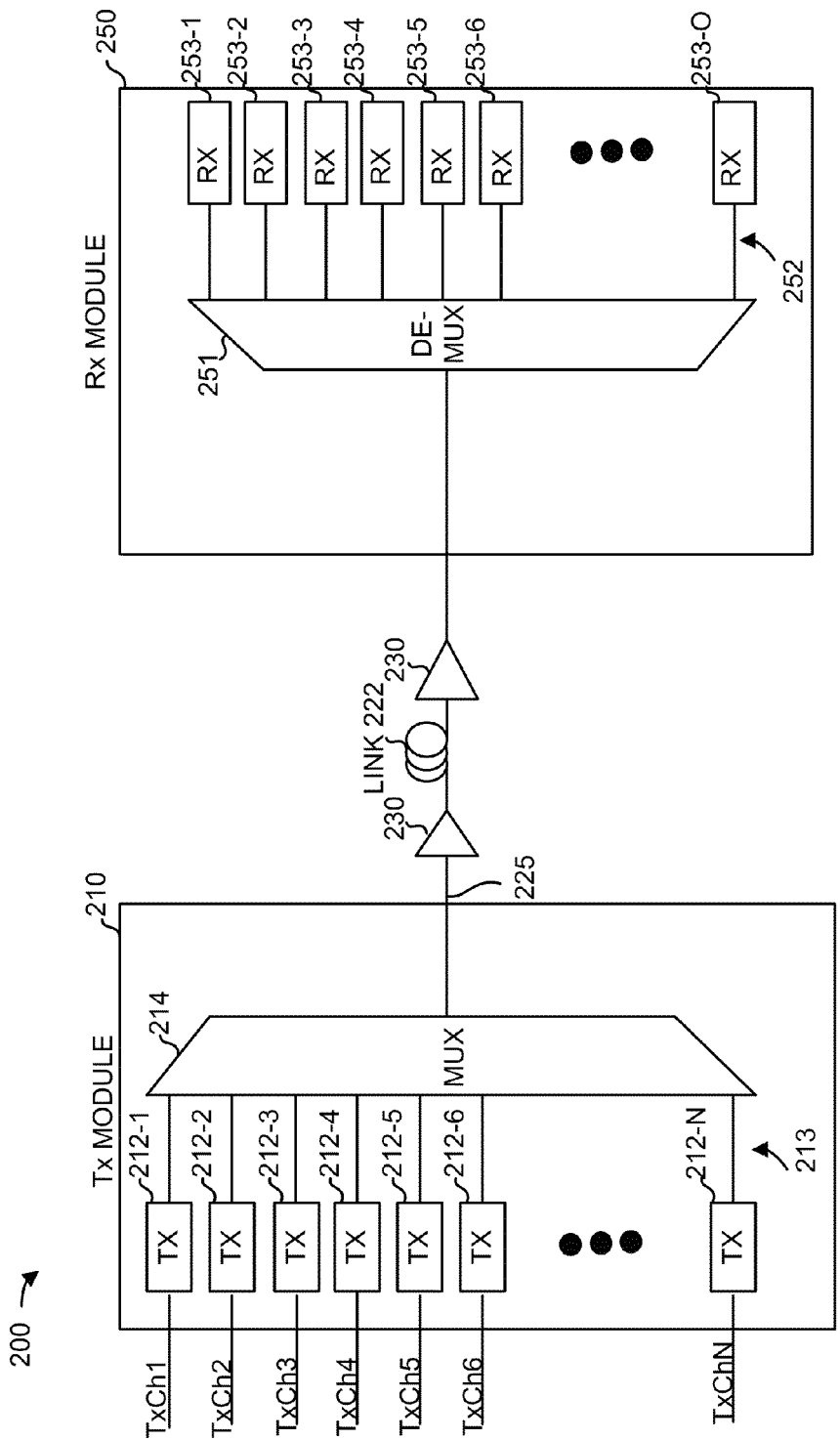
FIG. 2 is a diagram of an example network in which systems and/or methods, described herein, may be implemented.

FIG. 2 is a diagram of an example network 200 in which systems and/or methods, described herein, may be implemented. As illustrated in FIG. 2, network 200 may include transmitter (Tx) module 210 (e.g., a Tx PIC) and/or receiver (Rx) module 250 (e.g., an Rx PIC). In some implementations, transmitter module 210 may be optically connected to receiver module 250 via link 222, and/or optical amplifiers 230. Link 222 may include one or more optical amplifiers 230 that amplify an optical signal as the optical signal is transmitted over link 222.

Transmitter module 210 may include a number of optical transmitters 212-1 through 212-N (where N≥1), waveguides 213, and/or optical multiplexer 214. Each optical transmitter 212 may receive a data channel (TxCh1 through TxChN), modulate the data channel with an optical signal, and transmit the data channel as an optical signal. In one implementation, transmitter module 210 may include 5, 10, 20, 50, 100, or some other number of optical transmitters 212. Each optical transmitter 212 may be tuned to use an optical carrier of a designated wavelength. It may be desirable that the grid of wavelengths emitted by optical transmitters 212 conform to a known standard, such as a standard published by the Telecommunication Standardization Sector (ITU-T).

In some implementations, each of optical transmitters 212 may include a laser, a modulator, a semiconductor optical amplifier (SOA), a digital signal processor (DSP), and/or some other component. The laser, modulator, and/or SOA may be coupled with a tuning element (e.g., a heater) that can be used to tune the wavelength of an optical signal channel output by the laser, modulator, or SOA. In some implementations, a single laser may be shared by multiple optical transmitters 212.

Waveguides 213 may include an optical link to transmit modulated outputs (referred to as "signal channels") of optical transmitters 212. In some implementations, each optical transmitter 212 may connect to one waveguide 213 or to multiple waveguides 213 to transmit signal channels of optical transmitters 212 to optical multiplexer 214. In some implementations, waveguides 213 may be made from a birefringent material and/or some other material.

Optical multiplexer 214 may include an arrayed waveguide grating (AWG) or some other multiplexing device. In some implementations, optical multiplexer 214 may combine multiple signal channels, associated with optical transmitters 212, into a wave division multiplexed (WDM) signal, such as optical signal 225.

As further shown in FIG. 2, receiver module 250 may include optical demultiplexer 251, waveguides 252, and/or optical receivers 253-1 through 253-O (where O≥1). In some implementations, optical demultiplexer 251 may include an AWG or some other demultiplexing device. Optical demultiplexer 251 may supply multiple signal channels based on a received WDM signal (e.g., optical signal 225). As shown in FIG. 2, optical demultiplexer 251 may supply signal channels to optical receivers 253 via waveguides 252.

Waveguides 252 may include optical links to transmit outputs of optical demultiplexer 251 to optical receivers 253. In some implementations, each optical receiver 253 may receive outputs via a single waveguide 252 or via multiple waveguides 252. In some implementations, waveguides 252 may be birefringent (e.g., based on the width of waveguides 252).

Optical receivers 253 may each operate to convert an input optical signal to an electrical signal that represents the transmitted data. In some implementations, optical receivers 253 may each include one or more photodetectors and/or related devices to receive respective input optical signals outputted by optical demultiplexer 251 and a local oscillator (e.g., a laser), convert the signals to a photocurrent, and provide a voltage output to function as an electrical signal representation of the original input signal.

While FIG. 2 shows a particular configuration of components in network 200, in practice, network 200 may include additional components, different components, or differently arranged components than what are shown in FIG. 2.

Figure 3:
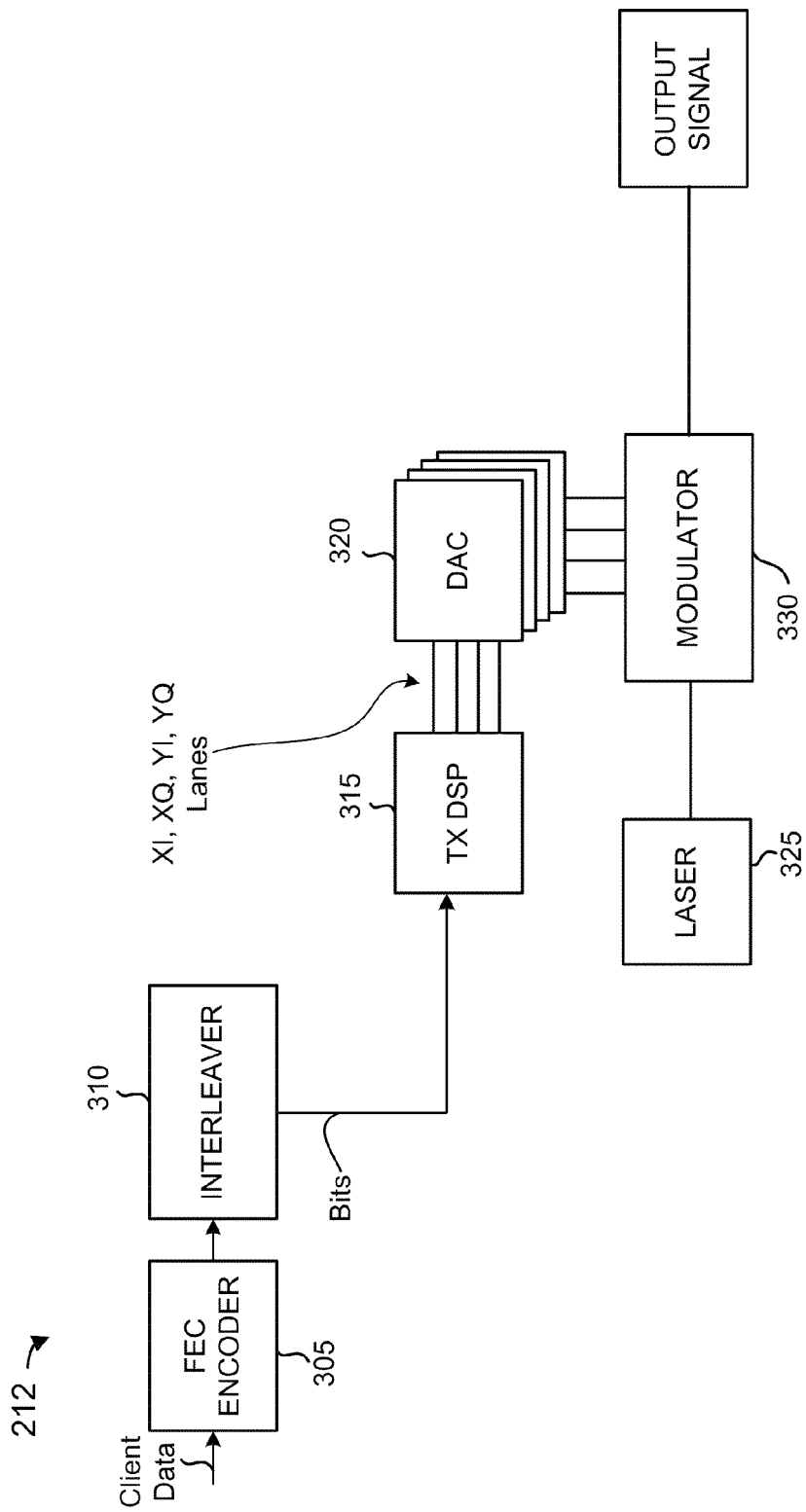
FIG. 3 is a diagram illustrating example components of an optical transmitter as shown in FIG. 2.

FIG. 3 is a diagram illustrating example elements of optical transmitter 212 as shown in network 200 of FIG. 2. As shown in FIG. 3, optical transmitter 212 may include forward error correction (FEC) encoder 305, interleaver 310, TX digital signal processor (DSP) 315, digital-to-analog converters (DACs) 320, laser 325, and/or modulator 330. In some implementations, components of multiple optical transmitters 212 may be implemented on a single integrated circuit, such as a single PIC, to form a super-channel transmitter.

FEC encoder 305 may include a digital encoding device, or a collection of digital encoding devices. In some implementations, FEC encoder 305 may receive client data, and may encode bits, associated with the client data, to control or reduce errors in the transmission of the bits. In some implementations, FEC encoder 305 may encode the bits using a block code, a convolution code, and/or some other code or technique. As described in greater detail below with respect to FIG. 5, the bits may be decoded by an FEC decoder.

Interleaver 310 may include a bit shuffling component that receives bits from FEC encoder 305 and shuffles the bits, such that, in conjunction with a de-interleaver in optical receiver 253, the effect may spread out and prevent multiple bits that may have errors from being grouped together (e.g., as described in greater detail below with respect to FIG. 5). In some implementations, interleaver 310 may group the bits in groups of four and provide the grouped bits to TX DSP 315.

TX DSP 315 may include a digital signal processor or a collection of digital signal processors. In some implementations, TX DSP 315 may receive a signal (e.g., corresponding to grouped bits from interleaver 310), process the signal, and output digital signals having symbols that represent components of the signal (e.g., an in-phase x-pol (XI) component, a quadrature (quad)-phase x-pol (XQ) component, an in-phase y-pol (YI) component, and a quadrature y-pol (YQ) component). In some implementations, TX DSP 315 may output the symbols across XI, XQ, YI, and YQ lanes. In some implementations, TX DSP 315 may digitally modulate the signal by mapping bits, associated with the signal, to the symbols (e.g., using a Hamming encoder). In some implementations, TX DSP 315 may digitally modulate the signal using a particular modulation format (e.g., a Binary Phase Shift Keying (BPSK) modulation format, a Quadrature Phase Shift Keying (QPSK) modulation format, or some other modulation format). In some implementations, TX DSP 315 may apply spectral shaping and/or perform filtering to the signal. Additional details regarding the operations of TX DSP 315 are described with respect to FIG. 4.

DACs 320 may include a signal converting device or a collection of signal converting devices. In some implementations, DACs 320 may receive respective digital signals from TX DSP 315, convert the received digital signals to analog signals, and provide the analog signals to modulator 330. The analog signals may correspond to electrical signals (e.g., voltages) to drive modulator 330.

Laser 325 may include a semiconductor laser, such as a distributed feedback (DFB) laser, or some other type of laser. Laser 325 may provide an optical signal to modulator 330. In some implementations, laser 325 may be an optical source for a single corresponding optical transmitter 212.

Modulator 330 may include an optical modulator, such as an electro-absorption modulator (EAM), a pair of nested Mach-Zehnder modulators (MZMs) for each polarization, or some other type of modulator. Modulator 330 may control (modulate) the intensity, amplitude, and/or phase of an optical signal (e.g., supplied by laser 325) in order to convey data associated with the data source (e.g., via one or more optical carriers of the optical signal). For example, modulator 330 may modulate the input optical light (e.g., from laser 325) based on an input voltage signal associated with the data source (e.g., an input voltage provided by DACs 320) to form an output signal. As described below with respect to FIG. 5, the output signal may be provided to optical receiver 253 such that optical receiver 253 may compare the intensity, amplitude, and/or phase of the output signal to a reference signal in order to recover data carried by the output signal.

Modulator 330 may be formed as a waveguide with electrodes for applying an electric field, based on the input voltage signal, in a direction perpendicular to the output signal output by laser 325. Alternatively, modulator 330 may be implemented based on other modulation technologies, such as electro-optic modulation.

In some implementations, multiple modulators 330 may be provided to modulate signals associated with particular components. For example, a first modulator 330 may be provided to modulate an in-phase x-pol component, a second modulator 330 may be provided to modulate a quadrature x-pol component, a third modulator 330 may be provided to modulate an in-phase y-pol component, and a fourth modulator 330 may be provided to modulate a quadrature y-pol component.

While FIG. 3 shows optical transmitter 212 as including a particular quantity and arrangement of components, in some implementations, optical transmitter 212 may include additional components, fewer components, different components, or differently arranged components.

Figure 4A:
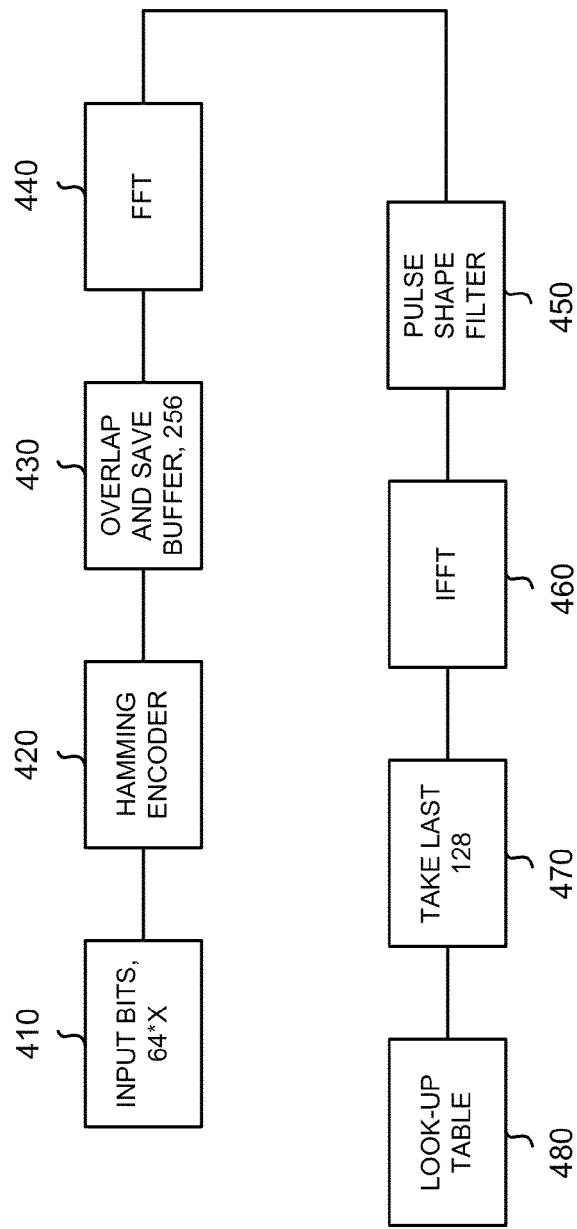
FIGS. 4A-4B illustrate example functional components of a transmitter digital signal processor.
Figure 4B:
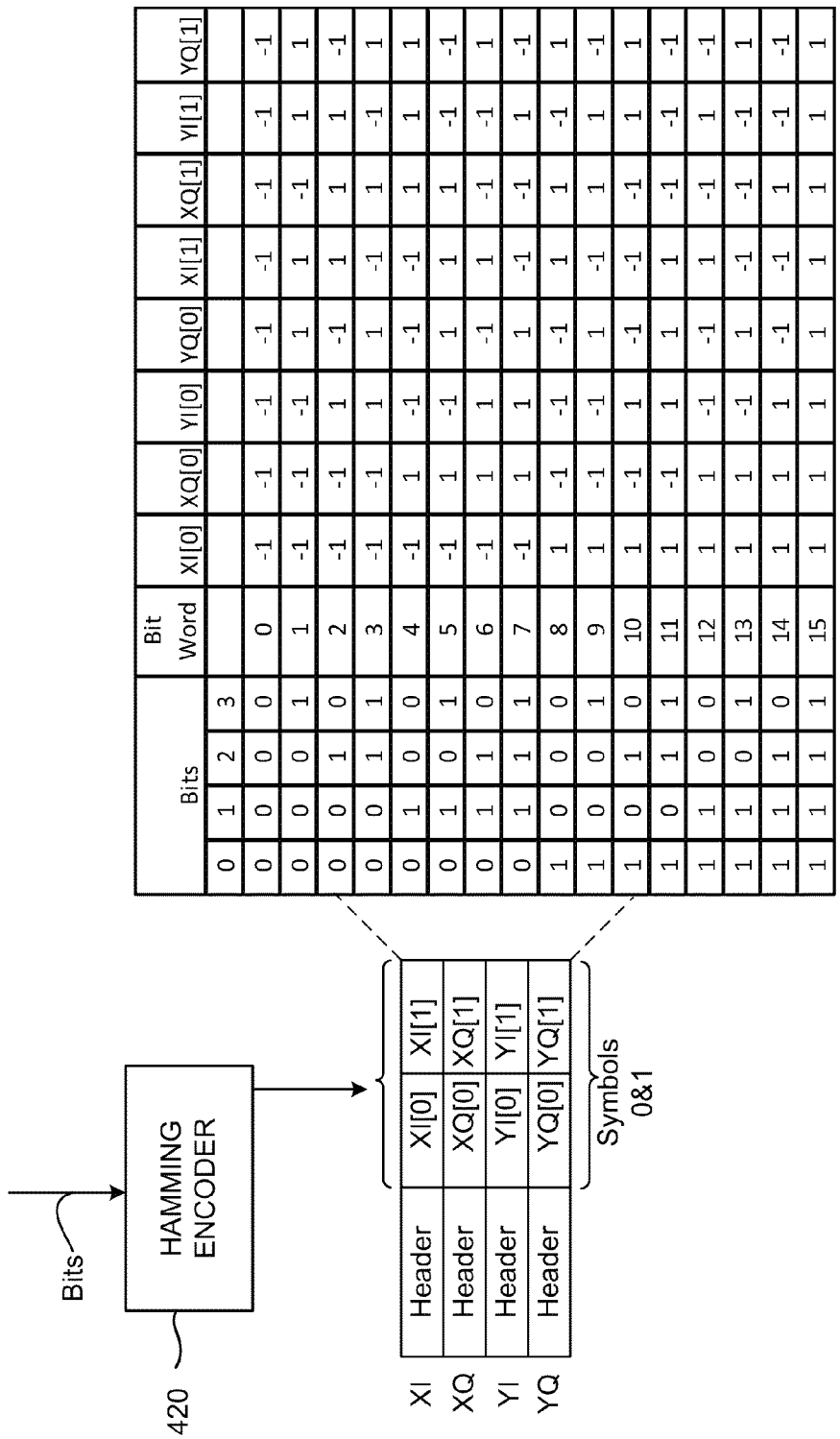

FIGS. 4A-4B are diagrams illustrating example functional components of TX DSP 315. The particular functional components, which may be included in TX DSP 315, may vary based on desired performance characteristics and/or computational complexity.

As shown in FIG. 4A, TX DSP 315 may include an input bits component 410, a Hamming encoder 420, an overlap and save buffer 430, a fast Fourier transform (FFT) component 440, a pulse shaping filter 450, an inverse FFT (IFFT) component 460, a take last 128 points 470 (e.g., assuming a 256-point FFT is used as an example), and a look-up table component 480.

Assuming a sampling frequency of twice the baud rate with 256-point FFT, input bits component 410 may process 64*X bits at a time of the input data, where X is an integer. For dual-polarization QPSK, X would be four.

Hamming encoder 420 may include an (8,4) Hamming encoder and may encode the input bits by mapping the input bits to symbols on the complex plane in accordance with a ½ code rate. For example, Hamming encoder 420 may map four bits to two symbols in the dual-polarization QPSK constellation. Additional details regarding Hamming encoder 420 are described below with respect to FIG. 4B.

Overlap and save buffer 430 may buffer 256 samples. Overlap and save buffer 430 may receive 64 symbols (128 samples with zero insertion in between symbols) at a time from hamming encoder 420. Thus, overlap and save buffer 430 may combine 64 new symbols (128 samples), from Hamming encoder 420, with the previous 128 samples received from Hamming encoder 420.

FFT component 440 may receive 256 samples from overlap and save buffer 430, and may convert the samples from the time domain to the frequency domain using, for example, a fast Fourier transform (FFT). FFT component 440 may form 256 frequency bins as a result of performing the FFT.

Pulse shape filter 450 may apply a pulse shaping filter to the 256 frequency bins. The purpose of pulse shape filter 450 is to shape the signal to the desired spectrum so that channels can be packed together on a super-channel while minimizing inter-symbol interference (ISI) and adjacent channel interference (ACI). Pulse shape filter 450 may also be used to compensate for hardware imperfections of, associated with TX components, or part of chromatic dispersion (if desired) induced by link 222.

IFFT component 460 may receive the 256 frequency bins and return the signal back to the time domain, which may now be at the operating speed of DAC 320. IFFT component 460 may convert the signal to the time domain using, for example, an inverse fast Fourier transform (IFFT). Take last 128 component 470 may select the last 128 samples from IFFT component 460 (256-point FFT and IFFT are used here as an example). Look-up table 480 may include a table that identifies the integers to supply to DAC 320 based on the samples from take last 128 component 470. In one example implementation, look-up table 480 may include electrical field values and associated voltage signals. Look-up table 480 may use the samples to identify and output the appropriate integers. In some implementations, DAC 320 may generate voltage signals based on the integers from TX DSP 315.

Referring to FIG. 4B, Hamming encoder 420 may receive bits (e.g., a set of four bits from input bits component 410) and may map the bits to symbols. In some implementations, Hamming encoder may map the bits to symbols using a look-up table, an example of which is shown in FIG. 4B. In some implementations, Hamming encoder 420 may provide two symbols, each having four samples (e.g., XI, XQ, YI, and YQ samples). As an example, assume that Hamming encoder 420 receives the bits 0, 0, 0, and 0. Given this assumption, Hamming encoder 420 may provide a first symbol having the samples −1, −1, −1, and −1 corresponding respectively to XI[0], XQ[0], YI[0], and YQ[0] samples. Further, Hamming encoder 420 may provide a second symbol having the samples −1, −1, −1, and −1 corresponding respectively to XI[1], XQ[1], YI[1], and YQ[1] samples.

In some implementations, the samples of the symbols may be provided across XI, XQ, YI, and YQ lanes. In some implementations, the symbols may be preceded by header bits that may include a known toggle sequence. In some implementations, the header bits may identify the start of a sequence that includes the symbols. In some implementations, the header bits may be encoded by Hamming encoder 420.

While FIGS. 4A-4B shows TX DSP 315 as including a particular quantity and arrangement of functional components, in some implementations, TX DSP 315 may include additional functional components, fewer functional components, different functional components, or differently arranged functional components. For example, TX DSP 315 may include a replicator component to replicate the 256 frequency bins to form 512 frequency bins. This replication may increase the sample rate.

Figure 5:
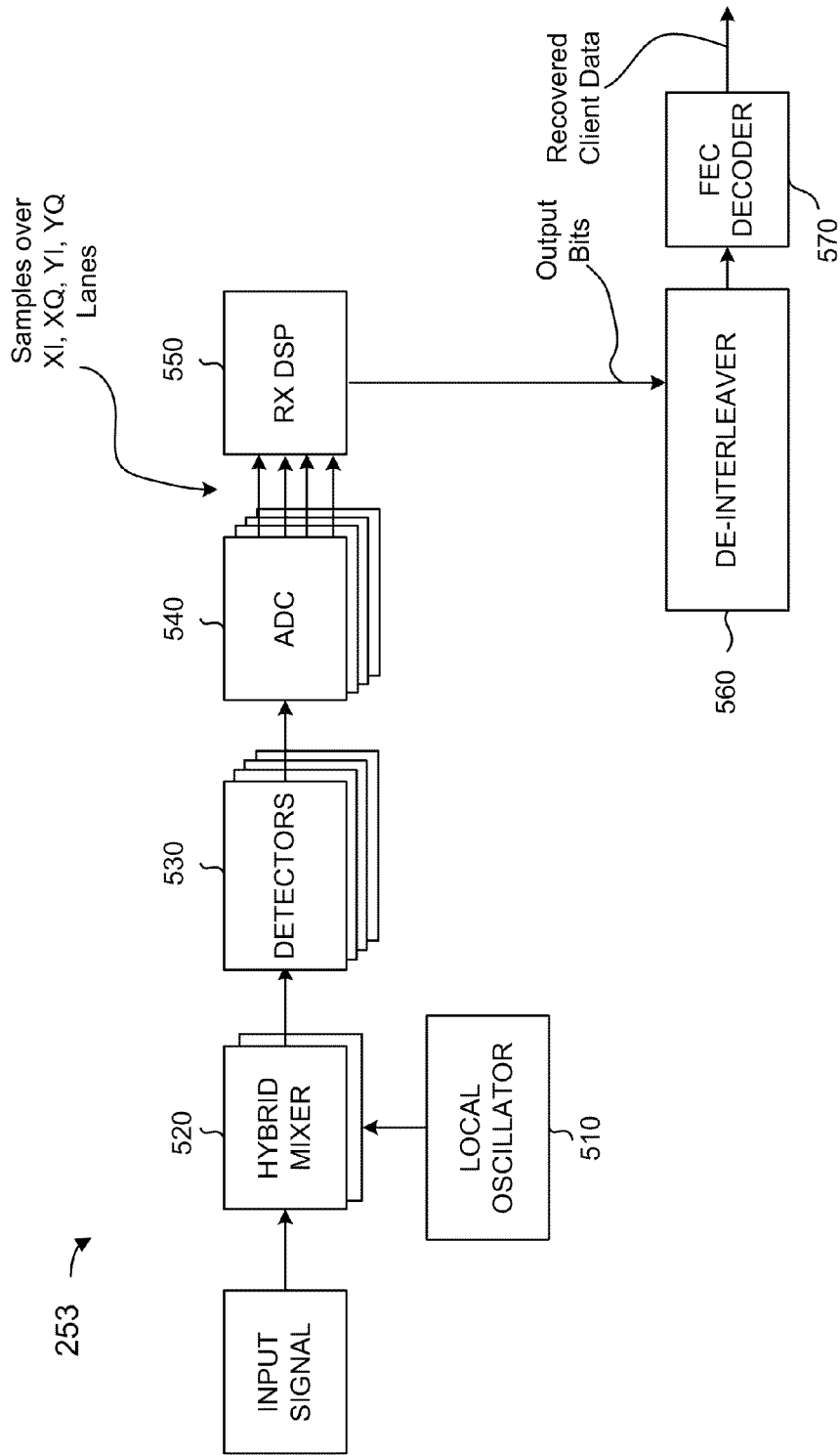
FIG. 5 is a diagram illustrating example components of an optical receiver as shown in FIG. 2.

FIG. 5 is a diagram illustrating example elements of optical receiver 253 as shown in network 200 of FIG. 2. As shown in FIG. 5, optical receiver 253 may include local oscillator (a laser) 510, hybrid mixers 520, detectors 530, analog-to-digital converters (ADCs) 540, RX digital signal processor (DSP) 550, de-interleaver 560, and/or FEC decoder 570. In some implementations, local oscillator 510, hybrid mixer 520, and detectors 530 may be implemented on a single integrated circuit, such as a single PIC. In some implementations, ADCs 540 and RX DSP 550 may be implemented using an application specific integrated circuit (ASIC). In some other implementations, local oscillator 510, hybrid mixer 520, and/or detectors 530, may be implemented on one or more PICs.

Local oscillator 510 may include a laser device or a collection of laser devices. In some implementations, local oscillator 510 may provide a reference signal to hybrid mixer 520. In some implementations, local oscillator 510 may include a single-sided laser to provide an optical signal to hybrid mixer 520. In some other implementations, local oscillator 510 may include a double-sided laser to provide multiple optical signals to multiple hybrid mixers 520. In some implementations, a phase, intensity, and/or amplitude of the reference signal may be compared to a phase, intensity, and/or amplitude of an input signal (e.g., a WDM signal supplied by optical demultiplexer 251 and corresponding to an output signal provided by transmitter module 212) to recover data carried by the input signal.

Hybrid mixer 520 may include one or more optical devices to receive an input signal (e.g., a WDM signal supplied by optical demultiplexer 251 and corresponding to an output signal provided by transmitter module 212). In some implementations, hybrid mixer 520 may receive a reference signal from local oscillator 510. In some implementations, hybrid mixer 520 may supply an output optical signal having components associated with the input signal and the reference optical signal to detectors 530. For example, hybrid mixer 520 and detectors 530 may supply an XI component, an XQ component, a YI component, and a YQ component. In some implementations, a first hybrid mixer 520 may provide the XI component and the XQ component, and a second hybrid mixer 520 may provide the YI component and the YQ component.

Detectors 530 may include one or more photodetectors, such as a photodiode, to receive an output optical signal, from hybrid mixer 520, and convert the output optical signal to corresponding voltage signals. In some implementation, optical receiver 253 may include multiple detectors for XI components, XQ components, YI components, and YQ components. In some implementations, detectors 530 may include one or more balanced pairs of photodetectors. For example, detectors 530 may include a first pair of photodetectors to receive an XI component, a second pair of photodetectors to receive an XQ component. Additionally, detectors 530 may include a third pair of photodetectors to receive a YI component and a fourth pair of photodetectors to receive a YQ component.

ADC 540 may include an analog-to-digital converter that converts the voltage signals from detectors 530 to digital signals. ADC 540 may provide the digital signals to RX DSP 550. In some implementations, optical receiver 253 may include four ADCs 540 or some other number of ADCs 540 (e.g., one ADC 540 for each electrical signal output by detectors 530). In some implementations, the digital signals may include samples associated with the input signal. In some implementations, the samples may be provided over XI, XQ, YI, and YQ lanes.

RX DSP 550 may include a digital signal processing device or a collection of digital signal processing devices. In some implementations, RX DSP 550 may receive digital signals from ADC 540 and may process the digital signals (e.g., to reduce phase noise, chromatic dispersion, timing skews, etc., associated with the digital signals introduced during transmission of a corresponding input signal received by hybrid mixer 520 and detectors 530) to form output bits (also referred to as "soft metrics") including data associated with the input signal. Additional details regarding RX DSP 550 are described with respect to FIGS. 6A-6C.

De-interleaver 560 may include a bit collection component that receives output bits from RX DSP 550 in groups of fours. In some implementations, de-interleaver 560 may arranges the bits in four (FEC) frames such that first bits, of multiple groups of bits, are provided in a first frame; second bits, of the multiple groups of bits, are provided in a second frame; third bits, of the multiple groups of bits, are provided in a third frame; and fourth bits, of the multiple groups of bits, are provided in a fourth frame. In some implementations, de-interleaver 560 may group the first bits, second bits, third bits, and fourth bits from different groups to prevent bits with errors from being grouped together. Additional details regarding de-interleaver 560 are described below with respect to FIG. 7.

FEC decoder 570 may include a digital decoding device, or a collection of digital decoding devices. In some implementations, FEC decoder 570 may receive grouped bits from de-interleaver 560 and decode the bits using a block code, a convolution code, and/or some other code or technique. In some implementations, FEC decoder 570 may decode the bits to form recovered client data corresponding to client data provided to optical transmitter 212, as described above.

While FIG. 5 shows optical receiver 253 as including a particular quantity and arrangement of components, in some implementations, optical receiver 253 may include additional components, fewer components, different components, or differently arranged components. For example, optical receiver 253 may include a chromatic dispersion compensating component and/or some other component to compensate for dispersion associated with digital signals provided by ADCs 540.

Figure 6A:
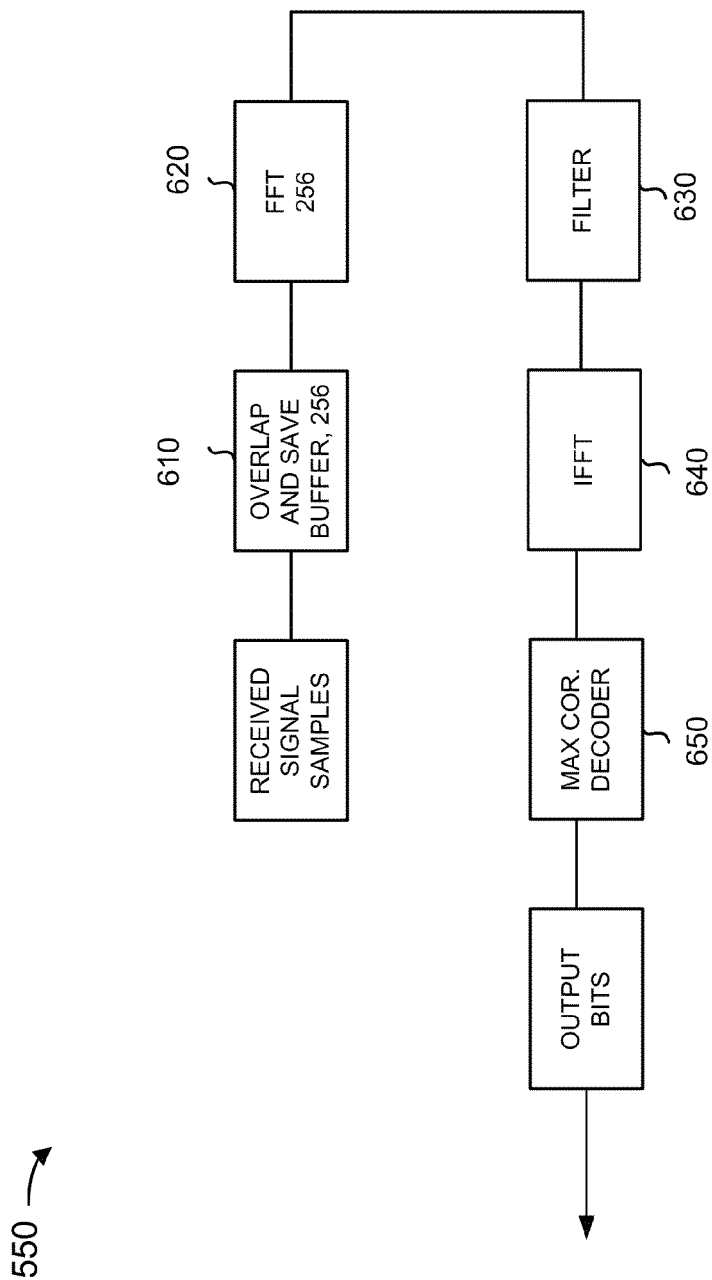
FIGS. 6A-6C illustrate example functional components of a receiver digital signal processor.
Figure 6B:
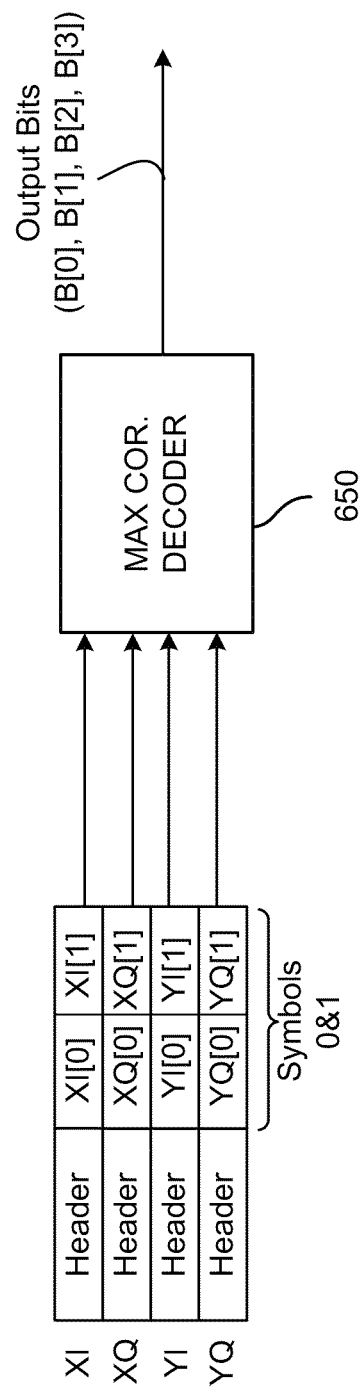
Figure 6C:
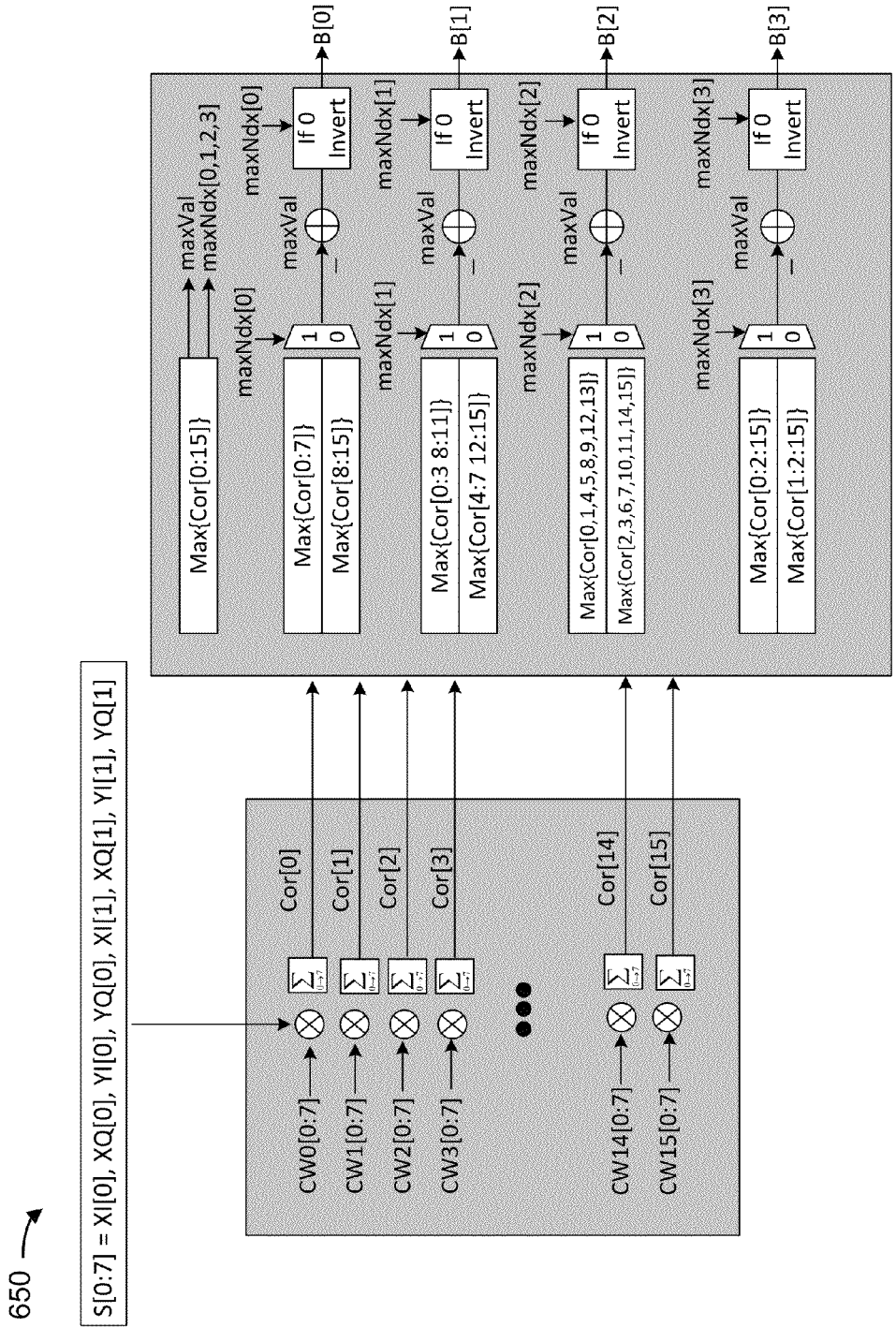

FIGS. 6A-6C illustrate example functional components of a RX DSP 550. The particular functional components, which may be included in RX DSP 550, may vary based on desired performance characteristics and/or computational complexity.

As shown in FIG. 6A, RX DSP 550 may include overlap and save buffer component 610, FFT component 620, filter component 630, IFFT component 640, and maximum correlation decoder component 650.

In some implementations, overlap and save buffer 610 may receive signal samples from ADC 540 and may buffer 256 samples, associated with the received signal samples. In some implementations, the received signal samples may be associated with samples of an input signal provided by optical transmitter 212 with the introduction of phase noise, timing skew, chromatic dispersion, etc., that are to be reduced by RX DSP 550 and/or de-interleaver 560. In some implementations, the received signal samples may be Hamming encoded (e.g., as described above with respect to FIG. 4A).

In some implementations, FFT component 620 may receive the 256 symbols from overlap and save buffer 610, and may convert the symbols from the time domain to the frequency domain using, for example, an FFT. FFT component 620 may form 256 frequency bins as a result of performing the FFT.

In some implementations, filter 630 may perform filtering functions to the 256 frequency bins, such as chromatic dispersion compensation filtering, timing skew correction, and/or some other type of filtering or processing (e.g., to prepare the received signal samples, associated with the 256 frequency bins, to be decoded by maximum correlation decoder 650). In some implementations, filter 630 may provide a filtered signal, having the 256 filtering bins, to IFFT component 640. IFFT component 640 may receive the 256 frequency bins and return the signal back to the time domain. IFFT component 640 may convert the signal to the time domain using, for example, an IFFT.

In some implementations, maximum correlation decoder 650 may receive samples of the signal (e.g., after being prepared for decoding by filter 630 and IFFT component 640), and may provide output bits, corresponding to the received samples, in groups of four. As described in greater detail below with respect to FIG. 6C, maximum correlation decoder 650 may correlate the received samples with known code word samples to determine output bits having data associated with an input signal provided by optical transmitter 212 (e.g., an input signal received by hybrid mixer 520). For example, maximum correlation decoder 650 may determine a maximum correlation (e.g., corresponding to a minimum Euclidean distance) between the received samples and the known code word samples to determine the code word that most likely correlates with the received samples.

Referring to FIG. 6B, maximum correlation decoder 650 may receive the samples and identify corresponding symbols. For example, maximum correlation decoder 650 may identify header bits (e.g., a known sequence) and identify the symbols proceeding the header bits. In some implementations, the symbols may correspond to symbols provided by Hamming encoder 420 with the addition of distortion and noise introduced during transmission of a corresponding signal associated with the symbols. As shown in FIG. 6B, maximum correlation decoder 650 may provide output bits corresponding to the symbols. For example, maximum correlation decoder 650 may provide four output bits for every two symbols. In some implementations, each symbol may include an XI sample, an XQ sample, a YI sample, and a YQ sample. Thus, the two symbols may include eight samples (e.g., XI[0], XQ[0], YI[0], YQ[0], XI[1], XQ[1], YI[1], YQ[1]).

Referring to FIG. 6C, maximum correlation decoder 650 may correlate the received samples to known code word samples to determine output bits corresponding to the received samples. In some implementations, the code word samples may be identified by a look-up table corresponding to a look-up table used by Hamming encoder 420 to map bits to symbols. An example of the look-up table, identifying code word samples for code word 0 to code word 1, is given below:

TABLE 1

| Code Word | XI[0] | XQ[0] | YI[0] | YQ[0] | XI[1] | XQ[1] | YI[1] | YQ[1] |
|---|---|---|---|---|---|---|---|---|
| 0  | −1 | −1 | −1 | −1 | −1 | −1 | −1 | −1 |
| 1  | −1 | −1 | −1 | 1  | 1  | −1 | 1  | 1  |
| 2  | −1 | −1 | 1  | −1 | 1  | 1  | 1  | −1 |
| 3  | −1 | −1 | 1  | 1  | −1 | 1  | −1 | 1  |
| 4  | −1 | 1  | −1 | −1 | −1 | 1  | 1  | 1  |
| 5  | −1 | 1  | −1 | 1  | 1  | 1  | −1 | −1 |
| 6  | −1 | 1  | 1  | −1 | 1  | −1 | −1 | 1  |
| 7  | −1 | 1  | 1  | 1  | −1 | −1 | 1  | −1 |
| 8  | 1  | −1 | −1 | −1 | 1  | 1  | −1 | 1  |
| 9  | 1  | −1 | −1 | 1  | −1 | 1  | 1  | −1 |
| 10 | 1  | −1 | 1  | −1 | −1 | −1 | 1  | 1  |
| 11 | 1  | −1 | 1  | 1  | 1  | −1 | −1 | −1 |
| 12 | 1  | 1  | −1 | −1 | 1  | −1 | 1  | −1 |
| 13 | 1  | 1  | −1 | 1  | −1 | −1 | −1 | 1  |
| 14 | 1  | 1  | 1  | −1 | −1 | 1  | −1 | −1 |
| 15 | 1  | 1  | 1  | 1  | 1  | 1  | 1  | 1  |

TABLE 2

| Bits | | | | Code Word |
|---|---|---|---|---|
| 0 | 1 | 2 | 3 | |
| 0 | 0 | 0 | 0 | 0 |
| 0 | 0 | 0 | 1 | 1 |
| 0 | 0 | 1 | 0 | 2 |
| 0 | 0 | 1 | 1 | 3 |
| 0 | 1 | 0 | 0 | 4 |
| 0 | 1 | 0 | 1 | 5 |
| 0 | 1 | 1 | 0 | 6 |
| 0 | 1 | 1 | 1 | 7 |
| 1 | 0 | 0 | 0 | 8 |
| 1 | 0 | 0 | 1 | 9 |
| 1 | 0 | 1 | 0 | 10 |
| 1 | 0 | 1 | 1 | 11 |
| 1 | 1 | 0 | 0 | 12 |
| 1 | 1 | 0 | 1 | 13 |
| 1 | 1 | 1 | 0 | 14 |
| 1 | 1 | 1 | 1 | 15 |

As shown in Table 1, each code word may correspond to two symbols, each having four samples (e.g., XI, XQ, YI, and YQ samples). For example, the code word 0 may correspond to a first symbol having the samples −1, −1, −1 and −1 corresponding respectively to XI, XQ, YI, and YQ samples. Further, the code word 0 may correspond to a second symbol having the samples −1, −1, −1 and −1 corresponding respectively to XI, XQ, YI, and YQ samples.

In some implementations, maximum correlation decoder 650 may multiply and add the received samples (e.g., samples S[0] through S[7], annotated as S[0:7], corresponding to the received samples XI[0], XQ[0], YI[0], YQ[0], XI[1], XQ[1], YI[1], YQ[1], respectively) with the code word samples for code words 0 through 15 (e.g., CW0[0:7] to CW15[0:7]) to form correlated values (e.g., Cor[0] through Cor[15]) as shown in the multiplication and summation functions in FIG. 6C.

As an example, maximum correlation decoder 650 may determine correlation values for Cor[0] through Cor[15] based on the equations:

$$Cor[0]=S[0]*CW0[0]+S[1]*CW0[1]+S[2]*CW0[2]+ \ldots +S[7]*CW0[7]$$

$$Cor[1]=S[0]*CW1[0]+S[1]*CW1[1]+S[2]*CW1[2]+ \ldots +S[7]*CW1[7]$$

$$Cor[15]=S[0]*CW15[0]+S[1]*CW15[1]+S[2]*CW15[2]+ \ldots +S[7]*CW15[7]$$

where S[0]-S[7] are the received XI[0], XQ[0], YI[0], YQ[0], XI[1], XQ[1], YI[1], and YQ[1] samples, respectively, and CWN[0]-CWN[7] are the XI[0], XQ[0], YI[0], YQ[0], XI[1], XQ[1], YI[1], and YQ[1] samples for code word N as shown in Table 1 above. In some implementations, the correlation values may be used to identify a particular code word (and corresponding bits of the particular code word) that most closely matches the received samples.

In some implementations, maximum correlation decoder 650 may identify a maximum value (e.g., maxVal) in the group including the values of Cor[0] through Cor[15], as represented by the function Max {Cor[0:15]}. In some implementations, maximum correlation decoder 650 may further identify a maximum index (maxNdx), corresponding to a code word associated with the maximum value, and bits for the maximum index (e.g., maxNdx[0, 1, 2, 3]). The bits of the code words may be identified in an example table given below.

As shown in Table 2, a code word may correspond to a group of four bits (e.g., the code word 0 may correspond to the bits 0, 0, 0, and 0). As an example, assume that Cor[7] has the maximum value of the values in the group including the values of Cor[0] to Cor[15]. Given this assumption, the maxNdx may correspond to code word 7. As identified in table 2, code word 7 may include bits 0, 1, 1, and 1 (i.e., maxNdx[0]=0, maxNdx[1]=1, MaxNdx[2]=1, and maxNdx[3]=1).

As another example, assume Cor[10] has the maximum value of the values in the group including the values of Cor[0] to Cor[15]. Given this assumption, the maxNdx may correspond to code word 10. As identified in Table 2, code word 10 may include bits 1, 0, 1, and 0 (i.e., maxNdx[0]=1, maxNdx[1]=0, MaxNdx[2]=1, and maxNdx[3]=0).

In some implementations, maximum correlation decoder 650 may determine four output bits (e.g., soft metrics B[0], B[1], B[2], and B[3]) based on maxVal and maxNdx bits (e.g., maxNdx [0, 1, 2, 3]). For example, maximum correlation decoder 650 may determine B[0] by identifying a first competing value, subtracting the first competing value from maxVal, and inverting the difference between the first competing value and maxVal when maxNdx[0] is 0 (e.g., since maxVal is greater than the competing value when maxNdx[0] is 0).

In some implementations, the first competing value may correspond to a maximum value in a subgroup of values of Cor[0] through Cor[15]. In some implementations, the subgroup may include those correlation values whose bits compete, or are opposite of, maxNdx[0]. For example, when maxNdx[0] is 1, the first competing value may be the maximum value in the subgroup including the values of Cor[0] through Cor[7], since the first bits in Cor[0] through Cor[7] are 0 (e.g., competing with, or opposite of the bit of maxNdx [0]), as shown in table 2 above that identifies 0 as the first bits in code words 0 through 7 (e.g., corresponding to the first bit in Cor[0] through Cor[7]). When maxNdx[0] is 0, the first competing value may be the maximum value in the subgroup including the values of Cor[8] to Cor[15], since the first bit in Cor[8] to Cor[15] is 1 (e.g., competing with, or opposite of, the bit of maxNdx[0]).

In a similar manner, maximum correlation decoder 650 may determine B[1] by identifying a second competing value, subtracting the second competing value from maxVal, and inverting the difference between the second competing value and maxVal when maxNdx[1] is 0. For example, when max-Ndx[1] is 1, the second competing value may be the maximum value in the subgroup including the values of Cor[0] to Cor[3], and Cor[8] to Cor[11], since the second bit in Cor[0]

to Cor[3], and Cor[8] to Cor[11] is 0. When maxNdx[1] is 0 the second competing value may be the maximum value in the subgroup including the values of Cor[4] to Cor[7] and Cor[12] to Cor[15], since the second bit in Cor[4] to Cor[7] and Cor[12] to Cor[15] is 1.

Further, maximum correlation decoder 650 may determine B[2] by identifying a third competing value, subtracting the third competing value from maxVal, and inverting the difference between the third competing value and maxVal when maxNdx[2] is 0. Finally, maximum correlation decoder 650 may determine B[3] by identifying a fourth competing value, subtracting the fourth competing value from maxVal, and inverting the difference between the fourth competing value and maxVal when maxNdx[3] is 0.

In some implementations, maximum correlation decoder 650 may provide output soft metrics B[0:3] to de-interleaver 560. In a similar manner, maximum correlation decoder 650 may provide multiple sets of output soft metrics in sets of four, such as output bits B[4:7], output soft metrics B[8:11], etc. In some implementations, the output soft metrics B may be hard-decoded or soft-decoded by iterative soft FEC decoding to recover data associated with an input signal provided by optical transmitter 212.

While FIGS. 6A-6C shows RX DSP 550 and maximum correlation decoder 650 as including a particular quantity and arrangement of functional components, in some implementations, RX DSP 550 and maximum correlation decoder 650 may include additional functional components, fewer functional components, different functional components, or differently arranged functional components.

Figure 7:
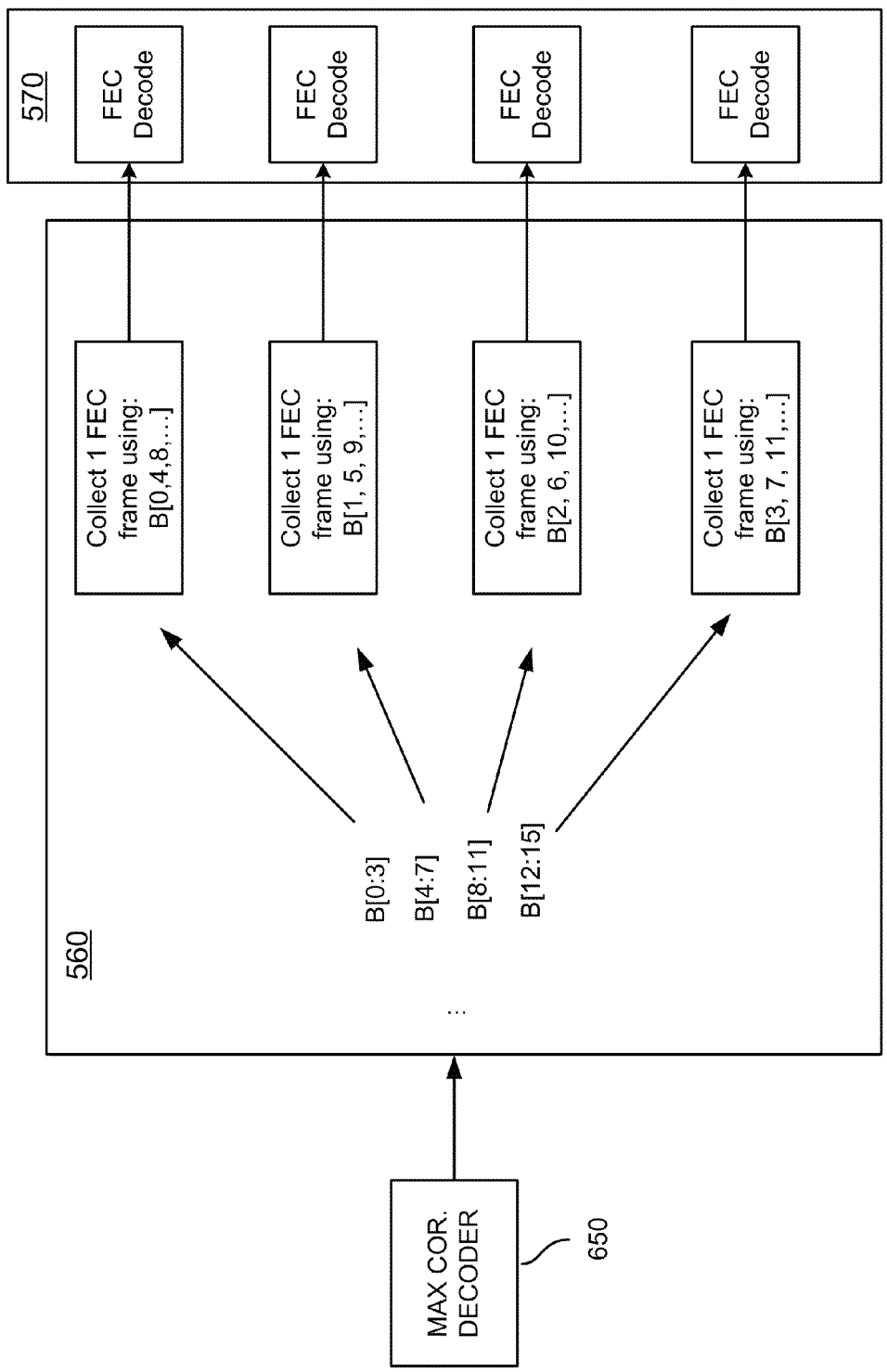
FIG. 7 illustrates a block diagram of example functional components of a de-interleaver shown in FIG. 5.

FIG. 7 illustrates a block diagram of example functions of a de-interleaver shown in FIG. 5. In some implementations, de-interleaver 560 may arrange bits (e.g., corresponding soft metrics provided by maximum correlation decoder 650) in four (FEC) frames such that first bits, of multiple sets of bits, are provided in a first frame; second bits, of the sets groups of bits, are provided in a second frame; third bits, of the multiple sets of bits, are provided in a third frame; and fourth bits, of the multiple sets of bits, are provided in a fourth frame.

For example, as shown FIG. 7, de-interleaver 560 may receive output soft metrics in sets of four from maximum correlation decoder 650. For example, de-interleaver 560 may receive output soft metrics B[0:3], B[4:7], B[8:11], B[12:15], etc. In some implementations, de-interleaver 560 may group first soft metrics in the sets including B[0:3], B[4:7], B[8:11], B[12:15] in a first frame. That is, de-interleaver 560 may group output soft metrics B[0, 4, 8, 12 . . . ] in a first frame, B[1, 5, 9, 13 . . . ] in a second frame, B[2, 6, 10, 14 . . . ] in a third frame, and B[3, 7, 11, 15 . . . ] in a fourth frame. As shown in FIG. 7, each of the four frames may be provided to FEC decoder 570. In some implementations, FEC decoder 570 may decode the bits in each frame to form recovered client data as described above. In some implementations, de-interleaver 560 may group the first bits, second bits, third bits, and fourth bits from different sets of bits to prevent bits with errors from being grouped together.

While FIG. 7 shows de-interleaver 560 as including a particular quantity and arrangement of functional components, in some implementations, de-interleaver 560 may include additional functional components, fewer functional components, different functional components, or differently arranged functional components.

Figure 8:
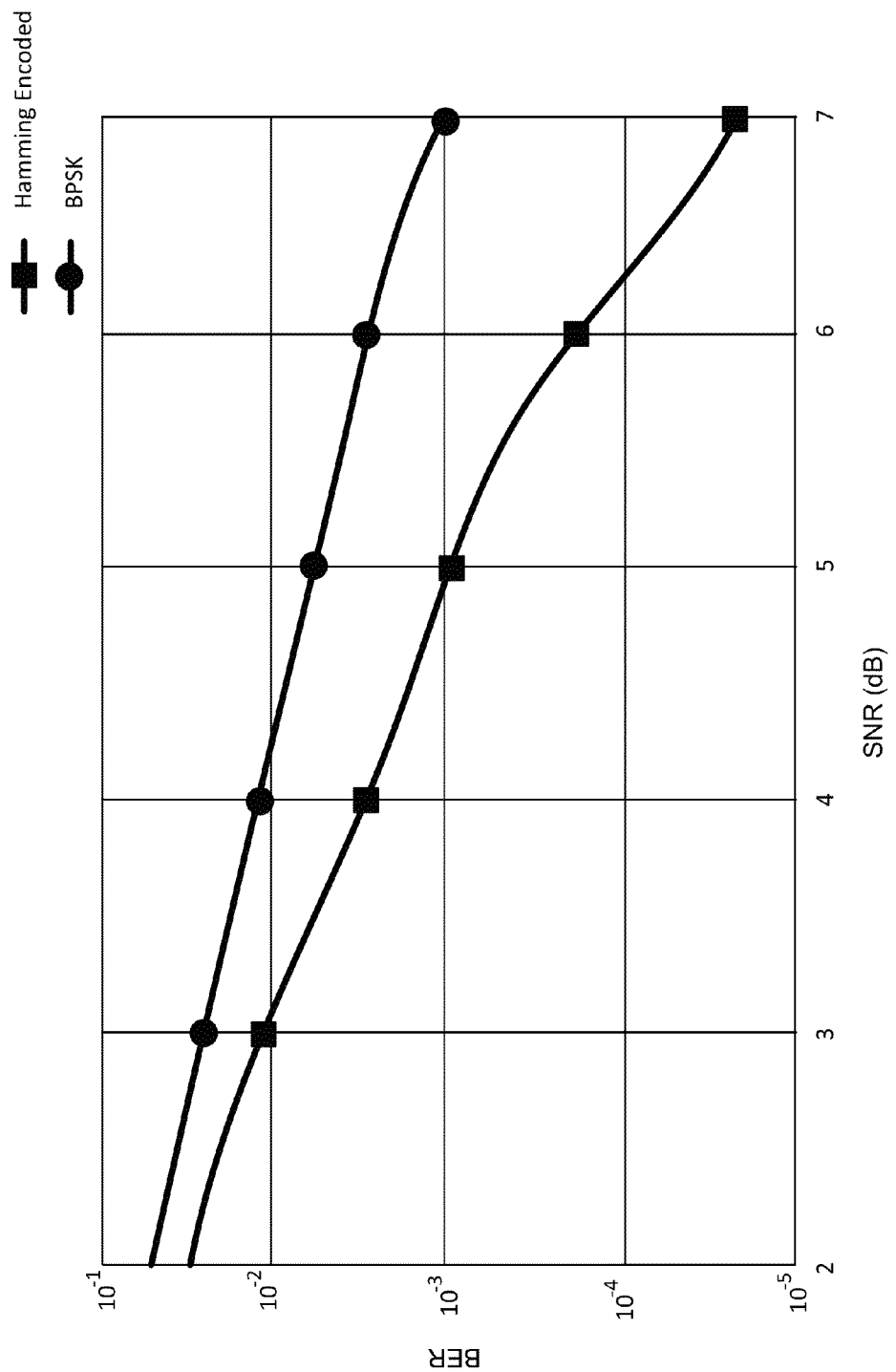
FIG. 8 illustrates a graph of example bit error rates for given signal to noise ratios.

FIG. 8 illustrates a graph of example bit error rates for given signal to noise ratios. In FIG. 8, bit error rates (BERs) as a function of signal to noise ratio (SNR, measured in symbol-rate bandwidth), for a first signal (e.g., a signal modulated using an (8,4) Hamming code) is shown with square data points. BERs as a function of SNR for a second signal (e.g., a BPSK signal not modulated with the (8,4) Hamming code) is shown with circle data points. As shown in FIG. 8, the first signal may have lower BERs for given SNRs in relation to the second signal. For example, for an SNR of six decibels (dB), the first signal has a BER of approximately $10^{-4}$, whereas the second signal has a BER of approximately $10^{-3}$ for the same SNR.

While FIG. 8 shows particular BERs for particular SNR values, in practice, the BERs may differ than what is shown. For example, the BERs for the first signal may be lower than what is shown based on transmission characteristics of link 222 and/or based on some other factor.

As described above, optical transmitter 212 may process samples (e.g., filter the samples, shape a spectrum, associated with the samples, etc.), associated with client data, convert the samples to analog signals, modulate an input optical signal based on the analog signals corresponding to the samples, and provide a modulated signal over an optical link (e.g., link 222) to optical receiver 253. In some implementations, optical receiver 253 may receive the signal, and provide samples of the signal (e.g., using local oscillator 510, hybrid mixer 520, detectors 530, and ADCs 540) to RX DSP 550. In some implementations, RX DSP 550 may process the received samples, correct for chromatic dispersion and/or timing skews of the received samples, and provide output bits of the received samples using maximum correlation decoder 560.

In some implementations, the received samples may correspond to transmitted samples provided by Hamming encoder 420 with distortion and noise introduced by the link 222. In some implementations, maximum correlation decoder 650 may correlate the received samples with a look-up table that identifies known code word samples to determine the code word that most likely correlates with the received samples. Based on determining the code word, maximum correlation decoder 650 may provide bits, corresponding to the code word, and corresponding to recovered client data. As a result, a ½ code rate (e.g., an (8,4) Hamming code) can be used to reduce BERs for a given SNR value and to determine the bits that correspond to the recovered client data.

The foregoing description provides illustration and description, but is not intended to be exhaustive or to limit the possible implementations to the precise form disclosed. Modifications and variations are possible in light of the above disclosure or may be acquired from practice of the implementations.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. An optical system comprising:
a digital signal processor (DSP) configured to:
receive first samples of a digital signal,
the first samples of the digital signal being Hamming encoded,
correlate the first samples to a plurality of groups of second samples to determine a plurality of correlation values,
each of the plurality of groups of second samples corresponding to a respective plurality of code words,
each of the plurality of correlation values corresponding to a correlation measurement between the first samples and each of the plurality of groups of second samples,
determine a particular code word, of the plurality of code words, corresponding to one of the correlation values of the plurality of correlation values,
determine output bits based on bits of the particular code word and the one of the correlation values, and
provide the output bits,
the output bits including data associated with the digital signal;
a local oscillator configured to provide a reference optical signal;
a hybrid mixer configured to:
receive an input signal,
receive the reference signal, and
provide an optical signal corresponding to the input signal and the reference signal,
a photodetector configured to:
receive the optical signal and
provide a voltage signal corresponding to the optical signal; and
an analog-to-digital converter (ADC) configured to:
receive the voltage signal, and
provide the digital signal based on receiving the voltage signal,
where when receiving the samples of the digital signal, the DSP is further configured to receive the samples of the digital signal based on the digital signal provided by the ADC.

2. The optical system in accordance with claim 1, where the DSP is further configured to:
determine a plurality of competing values based on the bits of the particular code word, and based on the plurality of correlation values,
where when determining the output bits, the DSP is configured to determine the output bits further based on the plurality of competing values.

3. The optical system in accordance with claim 1, where the first samples are (8,4) Hamming encoded.

4. The optical system in accordance with claim 1, where the output bits include a first set of output bits and a second set of output bits,
where the DSP is further configured to:
provide the first set of output bits and the second set of output bits to a de-interleaver to cause the de-interleaver to form a first frame and a second frame,
the first frame including a first bit, of the first set of output bits, and a first bit, of the second set of output bits,
the second frame including a second bit, of the first set of output bits, and a second bit, of the second set of output bits.

5. The optical system in accordance with claim 1, where the plurality of correlation values corresponds to respective Euclidean distance measurements between the first samples and each of the plurality of groups of second samples,
where the one of the correlation values corresponds to a minimum Euclidean distance between the first samples and second samples of the particular code word.

6. The optical system in accordance with claim 1, further comprising:
a filter configured to:
receive the first samples,
reduce timing skews associated with the first samples,
reduce chromatic dispersion associated with the first samples, and
provide the first samples after reducing the timing skews and the chromatic dispersion,
where when receiving the first samples, the DSP is further configured to receive the first samples provided by the filter.

7. An optical system comprising:
a first digital signal processor (DSP) configured to:
receive first samples of a digital signal,
the first samples of the digital signal being Hamming encoded,
correlate the first samples to a plurality of groups of second samples to determine a plurality of correlation values,
each of the plurality of groups of second samples corresponding to a respective plurality of code words,
each of the plurality of correlation values corresponding to a correlation measurement between the first samples and each of the plurality of groups of second samples,
determine a particular code word, of the plurality of code words, corresponding to one of the correlation values of the plurality of correlation values,
determining output bits based on bits of the particular code word and the one of the correlation values, and
provide the output bits, the output bits including data associated with the digital signal;
a second DSP configured to:
receive a group of input bits,
encode the group of input bits using an (8,4) Hamming encoder, and
provide symbols, associated with the group of input bits based on encoding the group of input bits;
a digital-to-analog-converter (DAC), configured to:
receive the symbols, and
provide a voltage corresponding to the symbols;
a laser configured to provide an input optical signal; and
a modulator configured to:
receive the voltage and the input optical signal,
modulate the input optical signal based on the voltage to form an output signal, and
provide the output signal,
where the digital signal corresponds to the output signal.

8. The optical system in accordance with claim 7, where the DSP is further configured to:
  determine a plurality of competing values based on the bits of the particular code word, and based on the plurality of correlation values,
  where when determining the output bits, the DSP is configured to determine the output bits further based on the plurality of competing values.

9. The optical system in accordance with claim 7, where the first samples are (8,4) Hamming encoded.

10. The optical system in accordance with claim 7, where the output bits include a first set of output bits and a second set of output bits,
  where the DSP is further configured to:
    provide the first set of output bits and the second set of output bits to a de-interleaver to cause the de-interleaver to form a first frame and a second frame,
      the first frame including a first bit, of the first set of output bits, and a first bit, of the second set of output bits,
      the second frame including a second bit, of the first set of output bits, and a second bit, of the second set of output bits.

11. The optical system in accordance with claim 7, where the plurality of correlation values corresponds to respective Euclidean distance measurements between the first samples and each of the plurality of groups of second samples,
  where the one of the correlation values corresponds to a minimum Euclidean distance between the first samples and second samples of the particular code word.

12. The optical system in accordance with claim 7, further comprising:
  a filter configured to:
    receive the first samples,
    reduce timing skews associated with the first samples,
    reduce chromatic dispersion associated with the first samples, and
    provide the first samples after reducing the timing skews and the chromatic dispersion,
  where when receiving the first samples, the DSP is further configured to receive the first samples provided by the filter.

13. An optical system comprising:
  a first digital signal processor (DSP) configured to:
    receive a group of input bits,
    encode the group of input bits using an (8,4) Hamming encoder, and
    provide symbols, associated with the group of input bits based on encoding the group of input bits;
  a digital-to-analog-converter (DAC) configured to:
    receive the symbols, and
    provide a voltage corresponding to the symbols;
  a laser configured to provide an input optical signal;
  a modulator configured to:
    receive the voltage and the input optical signal,
    modulate the input optical signal based on the voltage to form an output signal, and
    provide the output signal;
  a second DSP configured to:
    receive first samples of a digital signal corresponding to the output signal,
    correlate the first samples to a plurality of groups of second samples to determine a plurality of correlation values,
      each of the plurality of groups of second samples corresponding to a respective plurality of code words,
      each of the plurality of correlation values corresponding to a correlation measurement between the first samples and each of the plurality of groups of second samples,
    determine a particular code word, of the plurality of code words, corresponding to one of the correlation values of the plurality of correlation values,
    determine output bits based on bits of the particular code word and the one of the correlation values, and
    provide the output bits,
      the output bits including data associated with the output signal.

14. The optical system in accordance with claim 13, where the second DSP is further configured to:
  determine a plurality of competing values based on the bits of the particular code word and based on the plurality of correlation values,
  where when determining the output bits, the second DSP is configured to determine the output bits further based on the plurality of competing values.

15. The optical system in accordance with claim 13, where the output bits include a first set of output bits and a second set of output bits,
  where the second DSP is further to:
    provide the first set of output bits and the second set of output bits to a de-interleaver to cause the de-interleaver to form a first frame and a second frame,
      the first frame including a first bit, of the first set of output bits, and a first bit, of the second set of output bits, and
      the second frame including a second bit, of the first set of output bits, and a second bit, of the second set of output bits.

16. The optical system in accordance with claim 13, where the plurality of correlation values corresponds to respective Euclidean distance measurements between the first samples and each of the plurality of groups of second samples,
  where the one of the correlation values corresponds to a minimum Euclidean distance between the first samples and second samples of the particular code word.

17. The optical system in accordance with claim 13, further comprising:
  a filter configured to:
    receive the first samples,
    reduce timing skews associated with the first samples,
    reduce chromatic dispersion associated with the first samples, and
    provide the first samples after reducing the timing skews and the chromatic dispersion,
  where when receiving the first samples, the second DSP is further configured to receive the first samples provided by the filter.

18. The optical system in accordance with claim 13, further comprising:
  a local oscillator configured to provide a reference optical signal;
  a hybrid mixer configured to:
    receive the output signal,
    receive the reference signal, and
    provide an optical signal corresponding to the input signal and the reference signal,
  a photodetector configured to:
    receive the optical signal, and
    provide a voltage signal corresponding to the optical signal; and
  an analog-to-digital converter (ADC) configured to:
    receive the voltage signal, and provide the digital signal based on receiving the voltage signal,
where when receiving the samples of the digital signal, the second DSP is further configured to receive the samples of the digital signal based on the digital signal provided by the ADC.

19. An optical system comprising:
a local oscillator configured to provide a reference optical signal;
a hybrid mixer configured to:
  receive an input signal,
  receive the reference signal, and
  provide an optical signal corresponding to the input signal and the reference signal,
a photodetector configured to:
  receive the optical signal, and
  provide a voltage signal corresponding to the optical signal;
an analog-to-digital converter (ADC) configured to:
  receive the voltage signal, and
  provide the digital signal based on receiving the voltage signal;
a digital signal processor (DSP) configured to:
receive first samples of the digital signal,
  the first samples of the digital signal being Hamming encoded,
correlate the first samples to a plurality of groups of second samples to determine a plurality of correlation values,
  each of the plurality of groups of second samples corresponding to a respective plurality of code words,
  each of the plurality of correlation values corresponding to a correlation measurement between the first samples and each of the plurality of groups of second samples,
determine a particular code word, of the plurality of code words, corresponding to one of the correlation values of the plurality of correlation values,
determine output bits based on bits of the particular code word and the one of the correlation values, and
provide the output bits,
  the output bits including data associated with the digital signal.

20. The optical system in accordance with claim 19, where the DSP is further configured to:
determine a plurality of competing values based on the bits of the particular code word and based on the plurality of correlation values,
where when determining the output bits based, the DSP is configured to determine the output bits further based on the plurality of competing values.

21. The optical system in accordance with claim 19, where the first samples are (8,4) Hamming encoded.

22. The optical system in accordance with claim 19, where the output bits include a first set of output bits and a second set of output bits,
where the DSP is further to:
  provide the first set of output bits and the second set of output bits to a de-interleaver to cause the de-interleaver to form a first frame and a second frame,
    the first frame including a first bit, of the first set of output bits, and a first bit, of the second set of output bits, and
    the second frame including a second bit, of the first set of output bits, and a second bit, of the second set of output bits.

23. The optical system in accordance with claim 19, where the plurality of correlation values corresponds to respective Euclidean distance measurements between the first samples and each of the plurality of groups of second samples,
where the highest correlation value corresponds to a minimum Euclidean distance between the first samples and second samples of the particular code word.

24. The optical system in accordance with claim 19, where the DSP is a first DSP,
the optical system further comprising:
a second DSP configured to:
  receive a group of input bits,
  encode the group of input bits using an (8,4) Hamming encoder, and
  provide symbols associated with the group of input bits based on encoding the group of input bits;
a digital-to-analog-converter (DAC) configured to:
  receive the symbols, and
  provide a voltage corresponding to the symbols;
a laser configured to provide an input optical signal; and
a modulator configured to:
  receive the voltage and the input optical signal,
  modulate the input optical signal based on the voltage to form an input signal, and
  provide the input signal to the hybrid mixer.

* * * * *